(12) United States Patent
Lee et al.

(10) Patent No.: US 8,328,228 B2
(45) Date of Patent: Dec. 11, 2012

(54) ROOF AIRBAG APPARATUS FOR VEHICLE

(75) Inventors: Chang Hyun Lee, Yongin-si (KR); Hyeong Ho Choi, Gwangmyeong-si (KR); Ki Dong Song, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 98 days.

(21) Appl. No.: 12/956,223

(22) Filed: Nov. 30, 2010

(65) Prior Publication Data

US 2012/0080869 A1 Apr. 5, 2012

(30) Foreign Application Priority Data

Sep. 30, 2010 (KR) ........................ 10-2010-0095435

(51) Int. Cl.
*B60R 21/213* (2011.01)
*B60R 21/214* (2011.01)

(52) U.S. Cl. .................. 280/730.1; 280/729; 280/743.1; 280/743.2

(58) Field of Classification Search ............... 280/730.1, 280/729, 733, 743.1, 743.2
See application file for complete search history.

(56) References Cited

U.S. PATENT DOCUMENTS

| | | | | |
|---|---|---|---|---|
| 2,834,606 A * | 5/1958 | Bertrand | ................ | 280/730.1 |
| 3,774,936 A * | 11/1973 | Barnett et al. | ............ | 280/730.1 |
| 3,897,961 A * | 8/1975 | Leising et al. | ............ | 280/730.1 |
| 6,224,089 B1 * | 5/2001 | Uchiyama et al. | ......... | 280/728.2 |
| 6,460,878 B2 * | 10/2002 | Eckert et al. | ............... | 280/730.1 |
| 6,932,380 B2 * | 8/2005 | Choi | .......................... | 280/730.1 |
| 7,025,376 B2 * | 4/2006 | Dominissini | ................. | 280/729 |
| 7,195,276 B2 * | 3/2007 | Higuchi | ..................... | 280/730.1 |
| 7,331,597 B2 * | 2/2008 | Williams | ................... | 280/728.2 |
| 7,360,790 B2 * | 4/2008 | Hasebe et al. | ............ | 280/743.2 |
| 7,445,232 B2 * | 11/2008 | Takimoto | ..................... | 280/729 |
| 7,926,840 B1 * | 4/2011 | Choi | .......................... | 280/730.1 |
| 7,992,898 B2 * | 8/2011 | Johansson et al. | ......... | 280/743.1 |
| 7,997,615 B2 * | 8/2011 | Jang | ............................ | 280/743.1 |
| 8,002,309 B2 * | 8/2011 | Kim et al. | ..................... | 280/729 |
| 2004/0239082 A1 | 12/2004 | Schneider et al. | | |
| 2010/0225096 A1 * | 9/2010 | Bustos Garcia et al. | ... | 280/730.1 |
| 2012/0049491 A1 * | 3/2012 | Yoo | ............................... | 280/729 |
| 2012/0049492 A1 * | 3/2012 | Choi et al. | ................. | 280/730.1 |

FOREIGN PATENT DOCUMENTS

JP 2009-6924 A 1/2009

* cited by examiner

*Primary Examiner* — Faye M Fleming
*Assistant Examiner* — James English
(74) *Attorney, Agent, or Firm* — Morgan, Lewis & Bockius LLP (57) ABSTRACT

A roof airbag apparatus for a vehicle may include an inflator generating pressurized gas, an airbag cushion provided between a roof of a vehicle body and a head-lining to expand downwards towards a passenger who may be sitting on a seat when the pressurized gas may be supplied to the airbag cushion from the inflator, and a support panel provided on a lower portion of the airbag cushion to contact and screen the passenger's face when the airbag cushion expands.

5 Claims, 7 Drawing Sheets

ROOF AIRBAG APPARATUS FOR VEHICLE

CROSS-REFERENCE TO RELATED APPLICATIONS

The present application claims priority to Korean Patent Application No. 10-2010-0095435 filed on Sep. 30, 2010, the entire contents of which is incorporated herein for all purposes by this reference.

BACKGROUND OF THE INVENTION

1. Field of the Invention

The present invention relates, in general, to a roof airbag apparatus for a vehicle and, more particularly, to a roof airbag apparatus for a vehicle designed to inflate, in a front collision of a vehicle, an airbag cushion of small volume, which then expands from a roof of a vehicle to protect the occupants effectively.

2. Description of Related Art

Generally, an airbag apparatus is a vehicle safety device that fills rapidly with air or gas and expands in an automobile collision to protect the upper body of the occupant. The airbag apparatus includes a driver side airbag apparatus for protecting a driver and a passenger side airbag apparatus for protecting a passenger.

Figure 5A:
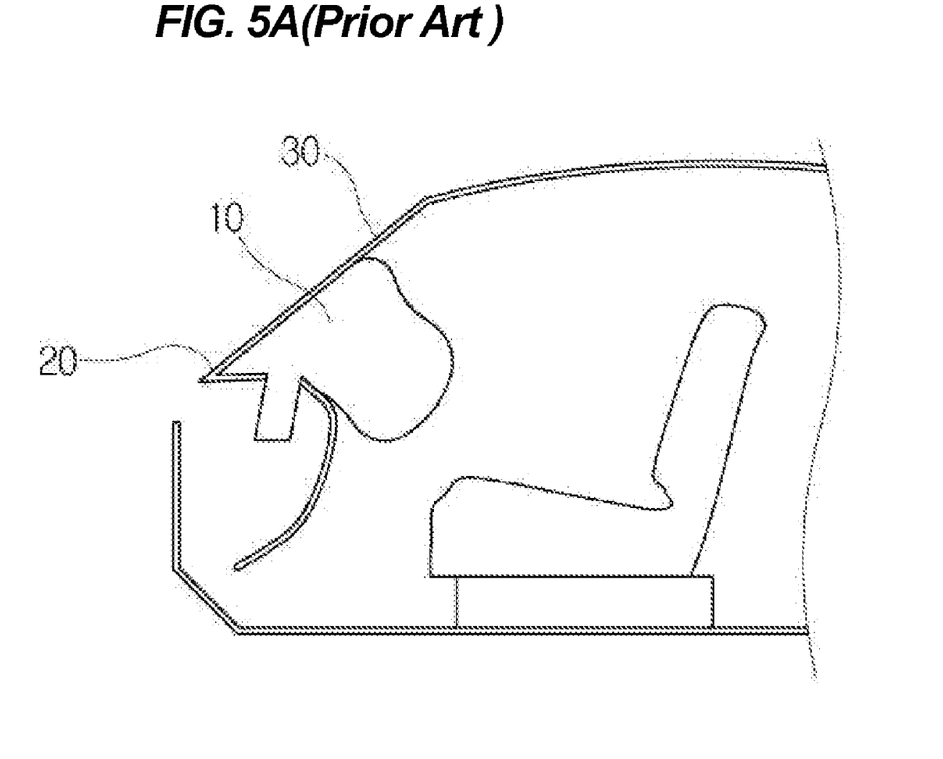
FIG. 5A is a view showing a passenger side airbag apparatus of the related art as it expands.

The passenger side airbag apparatus of the related art, as shown in FIG. 5A, includes an inflator 40 for generating gas, an airbag cushion 10 that expands with the gas supplied from the inflator 40, a housing 50 with parts mounted therein, and an airbag door 60.

Figure 5B:
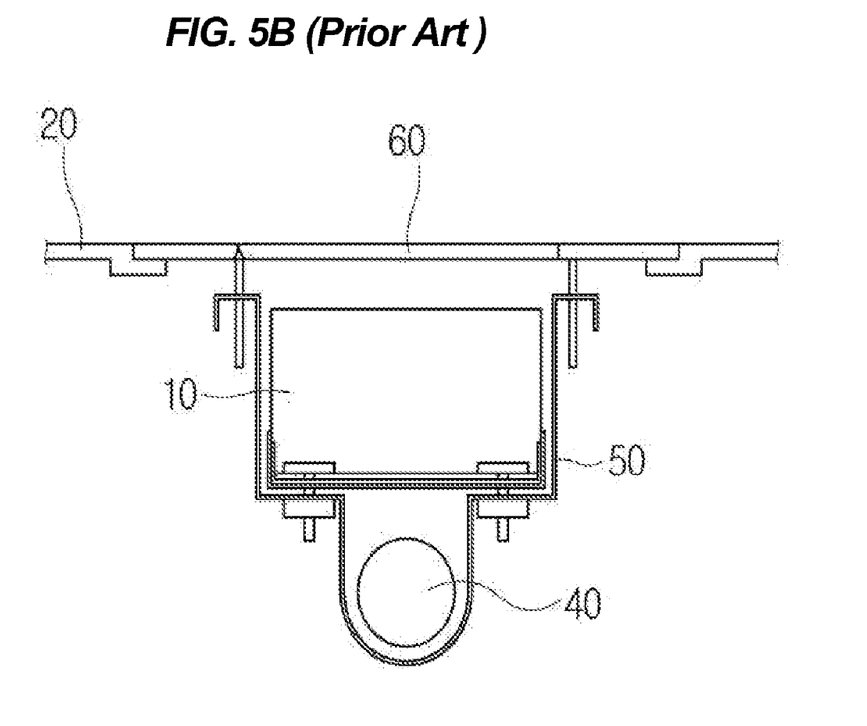
FIG. 5B is a constructional view showing the passenger side airbag apparatus of the related art.

The passenger side airbag apparatus is configured so that, as shown in FIG. 5B, in a normal state, the airbag cushion 10 is stored in the upper side of a crash pad 20, and in a vehicle collision, the airbag door 60 opens in the direction of the windshield glass following reception of a deployment signal from an airbag control unit (ACU) so that the airbag cushion 10 expands to contact the upper portion of the crash pad 20 and the windshield glass 30.

However, such a conventional passenger side airbag apparatus has a problem in that upon deployment of the airbag cushion, the airbag door opens and impacts on and may possibly break the windshield glass.

Further, in order to protect the passenger from a vehicle impact it needs a large-scale airbag that has a volume corresponding to wide space between the crash pad and the passenger, but such a large-scale airbag leads to an increase in the weight of a vehicle and its cost.

Moreover, while there is a difference in design of the crash pad and the windshield glass, such a difference in design also causes the shape and structure of the airbag cushion to differ, making it difficult to determine a standard passenger side airbag apparatus.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a roof airbag apparatus for a vehicle having an airbag cushion of a small volume that expands from a roof of a vehicle to safely protect the vehicle occupants from a front vehicle collision.

In an aspect of the present invention, the roof airbag apparatus for a vehicle may include an inflator generating pressurized gas; an airbag cushion provided between a roof of a vehicle body and a head-lining to expand downwards towards a passenger who is sitting on a seat when the pressurized gas is supplied to the airbag cushion from the inflator; and a support panel provided on a lower portion of the airbag cushion to contact and screen the passenger's face when the airbag cushion expands, wherein the airbag cushion has a cylindrical shape unfolding into a 'ㄱ' form while the pressurized gas is supplied to the airbag cushion from the inflator.

The airbag cushion includes a support cushion part fixed to a housing of the airbag cushion and to which the inflator is connected, and at least an expanding cushion part extending from the support cushion part and unfolded to expand towards an upper body of the passenger while the pressurized gas is supplied to the airbag cushion from the inflator, wherein the at least an expanding cushion includes first and second expanding cushion parts diverging from the support cushion part and unfolded to expand towards the upper body of the passenger.

The first and second expanding cushion parts are fixed at upper portions thereof to the housing by a fixing panel, wherein the housing is mounted to the roof of a vehicle body and supported by the head-lining when the airbag cushion expands.

A space is provided between lower portions of the first and second expanding cushion parts, and the support panel connects the lower portions of the first and second expanding cushion parts to cover the space in a rearward direction of the vehicle.

An inner panel is provided at a bent portion of the first and second expanding cushion parts such that lateral ends thereof are fixed to inner surface of the first and second expanding cushion parts to separate inner space of the first and second expanding cushion parts into upper and lower channels.

In another aspect of the present invention, an inner panel is provided at a bent portion of the at least an expanding cushion parts such that lateral ends thereof are fixed to inner surface of the at least an expanding cushion parts to separate inner space of the at least an expanding cushion parts into upper and lower channels.

According to the construction of the embodiment, the present invention has the following effects.

First, the airbag cushion that expands from the head-lining of a vehicle can protect the upper body of a passenger in an effective, safe manner from an impact in a front vehicle collision.

Second, since the airbag cushion designed to expand between the crash pad and the passenger has a small volume, the weight of a vehicle and the cost of a product can be reduced.

Third, since the airbag cushion is designed to expand from the head-lining, the shape and structure of the airbag apparatus can be standardized irrespective of a difference in design of the crash pad and the windshield glass.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Reference will now be made in greater detail to embodiments of the invention, an example of which is illustrated in the accompanying drawings. Wherever possible, the same reference numerals will be used throughout the drawings and the description to refer to the same or like parts.

Figure 1:
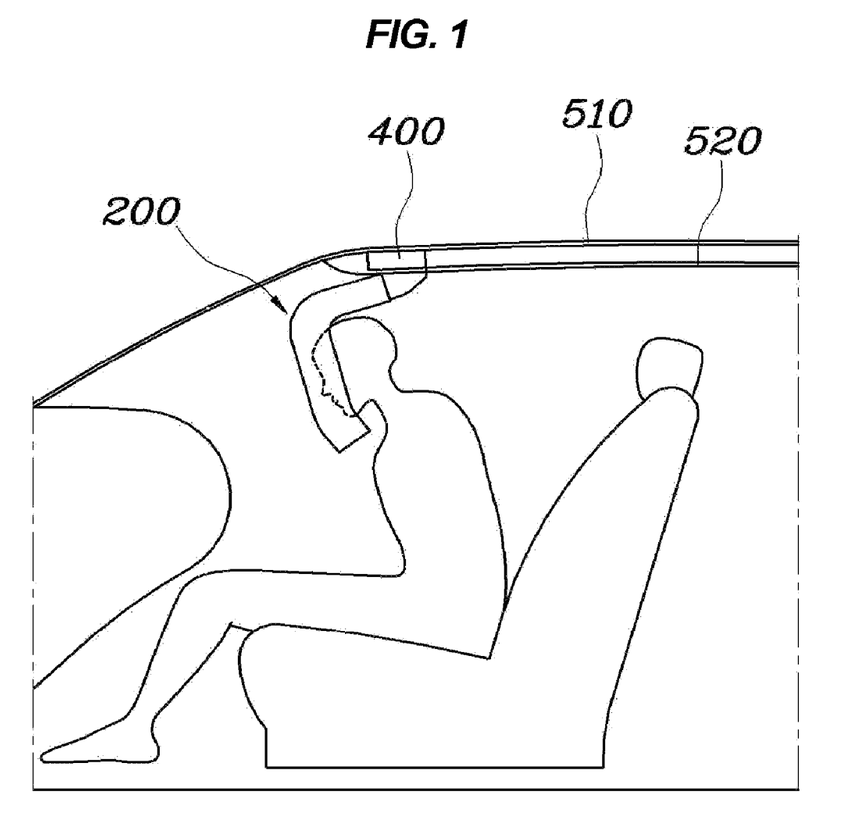
FIG. 1 is a schematic view showing the state of a roof airbag apparatus for a vehicle expanding according to an exemplary embodiment.
Figure 2:
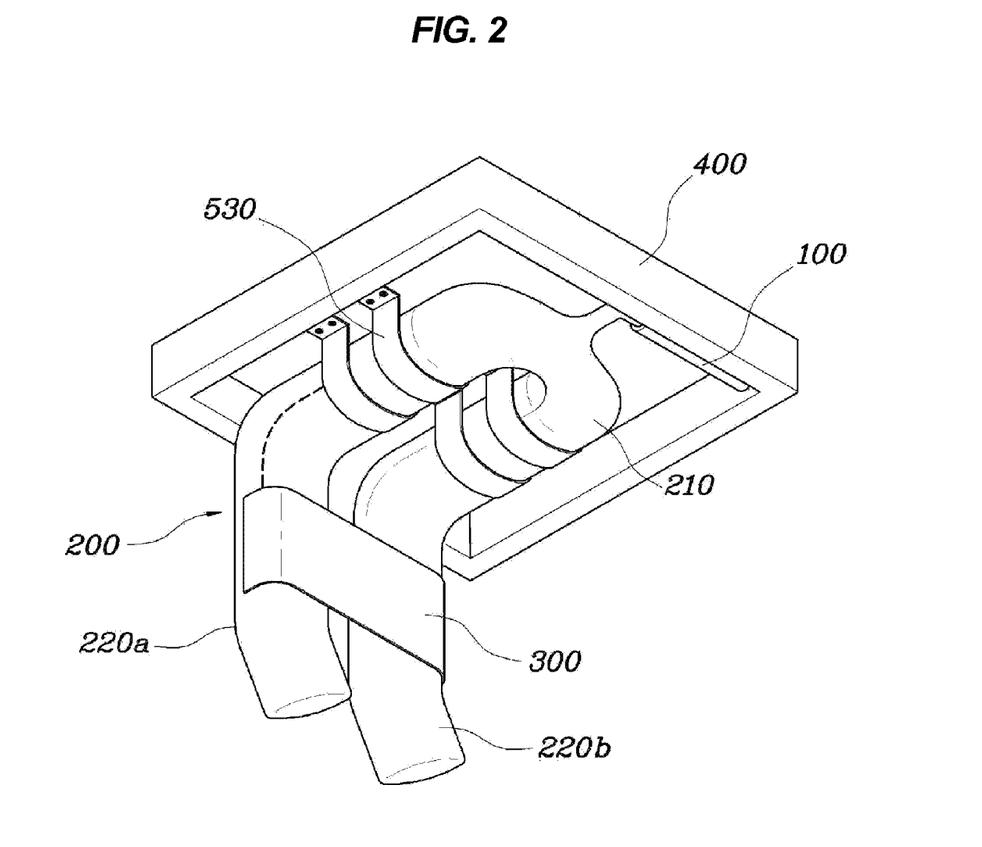
FIG. 2 is a perspective view showing a roof airbag apparatus for a vehicle according to an exemplary embodiment.
Figure 3:
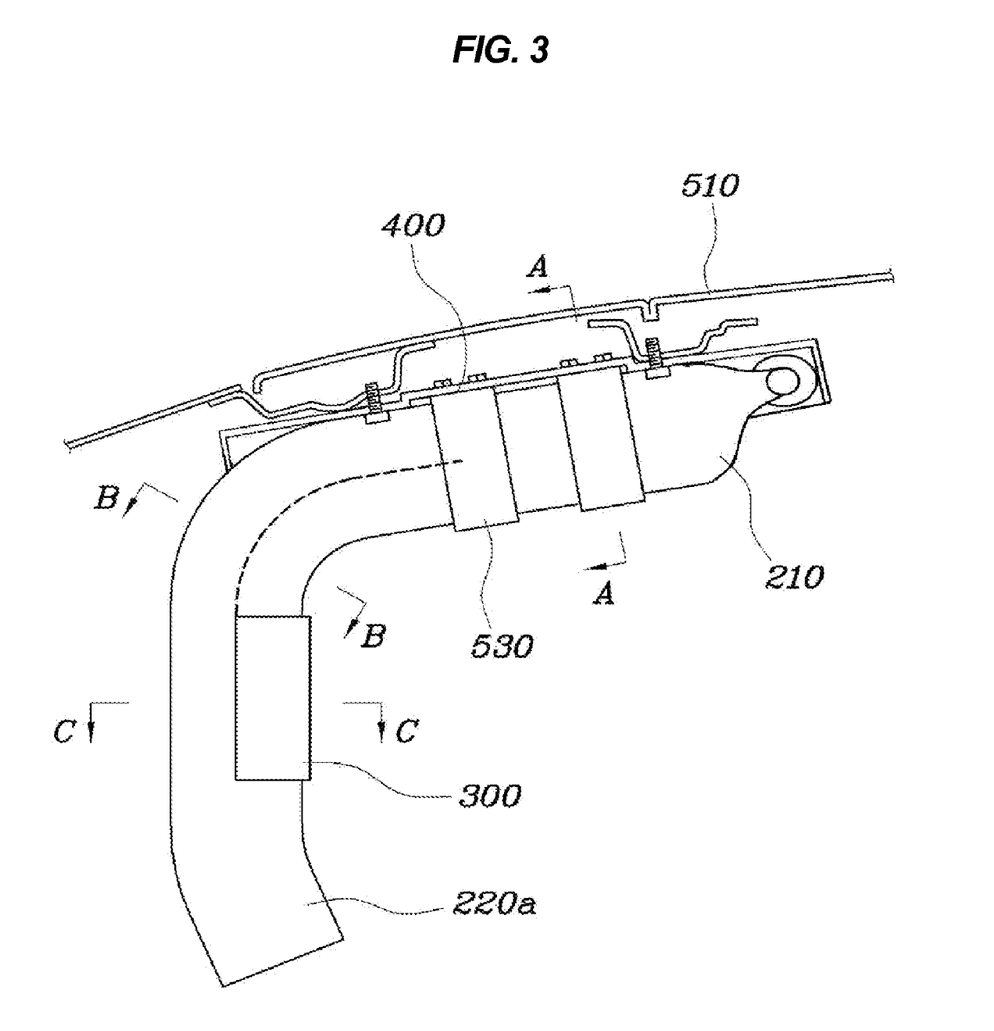
FIG. 3 is a side view showing the roof airbag apparatus of the exemplary embodiment

As shown in FIGS. 1 to 3, a roof airbag apparatus according to an exemplary embodiment is designed so that an airbag cushion 200 expands from a vehicle roof towards a space between a crash pad and a passenger, in order to effectively protect the passenger from a front collision of a vehicle.

The roof airbag apparatus includes an inflator 100, an airbag cushion 200, and a support panel 300.

The inflator 100 is for providing the airbag cushion 200 with pressurized gas in a vehicle collision. The inflator may be installed between a roof 510 of a vehicle body and a head-lining 520, preferably, through a separate housing 400.

Here, the housing 400 is a casing in which the inflator 100 is mounted on one side and the airbag cushion 200 is stored in a folded state.

The airbag cushion 200 is mounted in the housing 400, which is disposed between the roof 510 and the head-lining 520, such that it expands towards the front side of a passenger with the pressurized gas supplied from the inflator 100 in a vehicle collision, thereby protecting the passenger.

Particularly, taking into consideration a characteristic that expansion occurs from a roof in a vehicle, the airbag cushion 200 includes a support cushion part 210 for securing a supporting force of the airbag cushion 200 for the roof 510 of a vehicle body when the airbag cushion 200 expands, and first and second expanding cushion parts 220a and 220b that diverge from the support cushion part 210. In an exemplary embodiment, the airbag cushion 200 is realized as a cylindrical cushion that is generally bent into a '□' form.

The support cushion part 210 serves to transfer the pressurized gas from the inflator 100 to the first and second expanding cushion parts 220a and 220b, so that the support cushion part 210 has a Y-branch. The support cushion part 210 includes upper and lower fabric plates which are combined together by sewing.

Figure 4A:
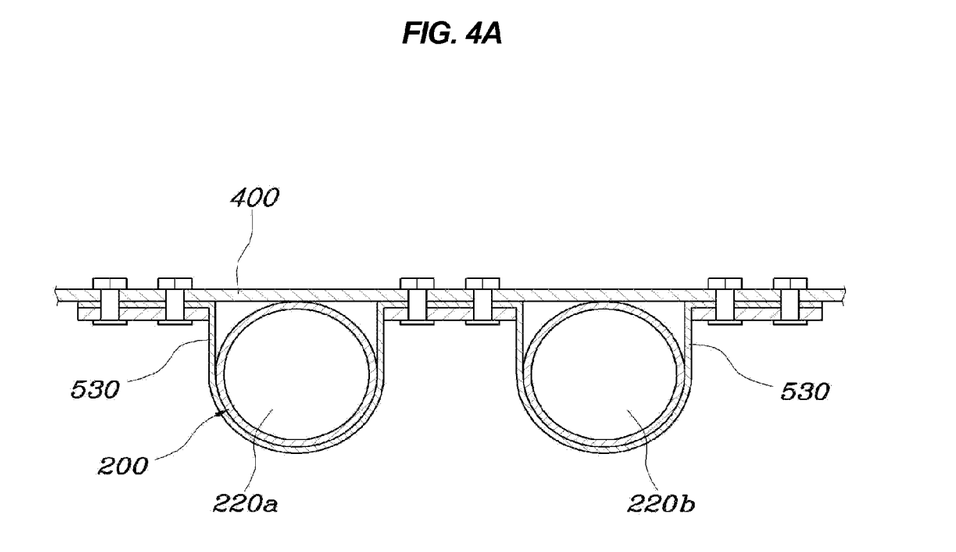
FIG. 4A is a cross-sectional view taken along line A-A of FIG. 3.
Figure 4B:
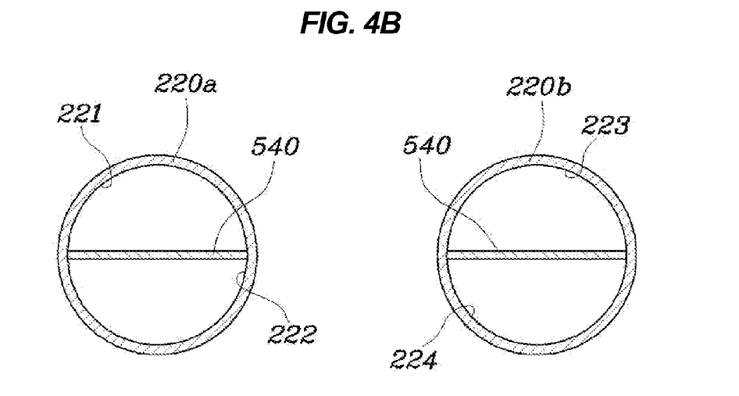
FIG. 4B is a cross-sectional view taken along line B-B of FIG. 3.
Figure 4C:
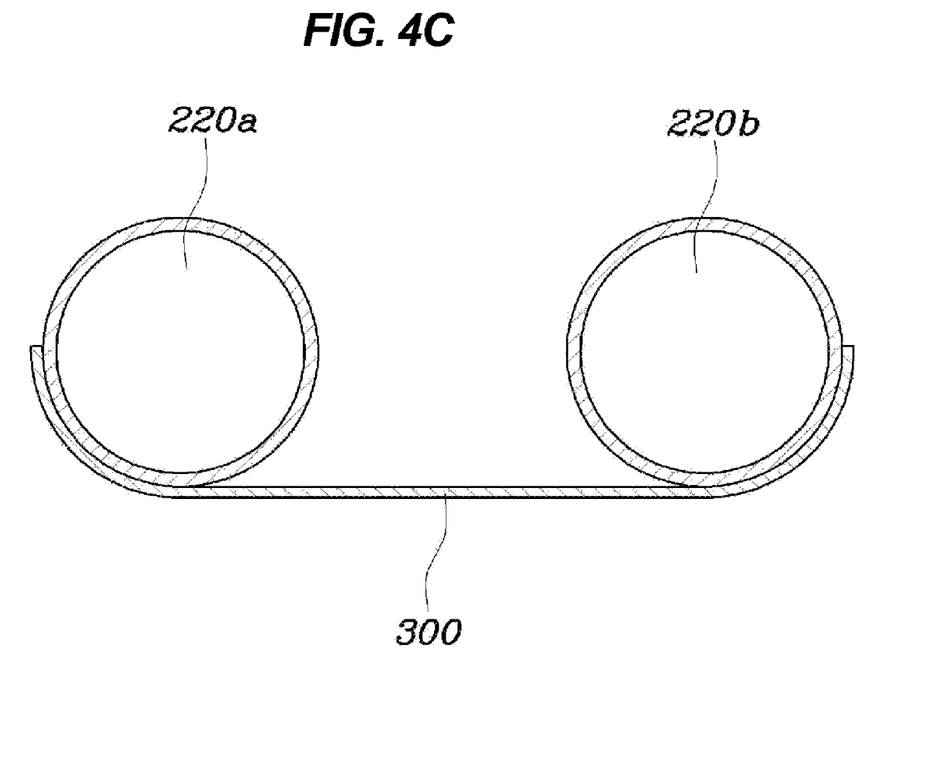
FIG. 4C is a cross-sectional view taken along line C-C of FIG. 3.

As shown in FIGS. 4A to 4C, the support cushion part 210 is fixed to the housing 400 mounted on the roof (510) of a vehicle body. The support cushion part 210 preferably has one end connected to the inflator 100 and another end branching off into a 'Y' form and connected to the first and second expanding cushion parts 220a and 220b. The branches of the support cushion part 210 are wrapped by a fixing panel 530 and bolted or riveted to the housing 400. Several fixing panels 530 are provided that are spaced at a distance in a lengthwise direction of the branches of the support cushion part 210, so as to fix the support cushion part 210 in such a way that they come as close as possible to the roof (510) of a vehicle body. The fixing panels 530 wrapping the support cushion part 210 are sewn to the support cushion part 210.

The first and second expanding cushion parts 220a and 220b directly contact and protect the upper body of a passenger, more particularly the front portion of passenger's shoulder when the airbag cushion 200 expands. Here, for general protection of the front portion of a passenger, the first and second expanding cushion parts have a structure of a bent cushion bar.

That is, the first and second expanding cushion parts 220a and 220b are connected at their upper portion to the support cushion part 210 by sewing, inner panels 540 are fixed to bent portions of the expanding cushion parts to connect the same, and a support panel 300 is connected to the lower portion of the expanding cushion parts to screen the face of a passenger when the airbag cushion 200 expands.

The inner panels 540 may separate the first and second expanding cushion parts 220a and 220b into upper channels 221 and 223 and lower channels 222 and 224.

Particularly, the support panel 300 includes a fabric material for covering the passenger's face, and is disposed in a space between the lower portions of the first and second expanding cushion parts 220a and 220b on the rear side of a vehicle. Thus, the support panel 300 can use the space to reliably contain the passenger's face in a vehicle collision.

That is, when the passenger's face moves to the space of the first and second expanding cushion parts 220a and 220b in a vehicle collision, the support panel 300 also moves to that space while contacting the passenger's face, increasing the contact time with the passenger's face and therefore reducing the impact amount applied to the passenger's head.

Meanwhile, the airbag cushion 200 is configured to have the support cushion part 210 and the first and second expanding cushion parts 220a and 220b in order to reliably protect a passenger in a vehicle collision while minimizing the entire volume of the airbag cushion 200. Thus, the first and second expanding cushion parts 220a and 220b are configured to have a bar shape, and the support panel 300, the fixing panel 530, and the inner panel 540 are configured to be made separately from fabric materials and connected to the airbag cushion 200 by sewing.

However, for the purpose of minimizing the entire volume of the airbag cushion 200, the support panel 300, the fixing panel 530, and the inner panel 540 are configured to be a portion of the airbag cushion, thereby providing an effect of reducing the number of manufacturing and assembling processes of a product.

The operation of the roof airbag apparatus will now be described.

First, when the inflator 100 operates in response to a vehicle collision, it generates pressurized gas, which is then transferred to the first and second expanding cushion parts 220a and 220b through the support cushion part 210. When the pressurized gas is supplied to the first and second expanding cushion parts 220a and 220b, the first and second cushion parts 220a and 220b expand from the head-lining 520 to the space between the crash pad and the passenger.

Here, the first and second expanding cushion parts 220a and 220b expand in a shape bent into a '☐' form that covers the front portion of the passenger's shoulder, and the support panel 300 of the first and second expanding cushion parts 220a and 220b contact and screen the passenger's face, thereby protecting the passenger effectively and safely from an impact while using a small amount of space.

As set forth above, according to the roof airbag apparatus, the airbag cushion expands between the crash pad and the passenger, reducing the weight of a vehicle and the cost of a product, and standardizing the shape and structure of the airbag apparatus irrespective of the different designs of the crash pad and the windshield glass.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A roof airbag apparatus for a vehicle comprising:
   an inflator generating pressurized gas;
   an airbag cushion provided between a roof of a vehicle body and a head-lining to expand downwards towards a passenger who is sitting on a seat when the pressurized gas is supplied to the airbag cushion from the inflator; and
   a support panel provided on a lower portion of the airbag cushion to contact and screen a region of a passenger's face when the airbag cushion expands;
   wherein the airbag cushion includes a support cushion part fixed to a housing of the airbag cushion and to which the inflator is connected, and at least an expanding cushion part extending from the support cushion part and unfolded to expand towards a region of a passenger's upper body while the pressurized gas is supplied to the airbag cushion from the inflator;
   wherein the at least an expanding cushion part includes first and second expanding cushion parts bifurcating from the support cushion part and unfolded to expand towards the region of the passenger's upper body;
   wherein the first and second expanding cushion parts are fixed at upper portions thereof to the housing by a fixing panel, wherein the housing is mounted to the roof of a vehicle body and supported by the head-lining when the airbag cushion expands.

2. The roof airbag apparatus according to claim 1, wherein the airbag cushion has a cylindrical shape unfolding into a ' ⌐ ' form while the pressurized gas is supplied to the airbag cushion from the inflator.

3. The roof airbag apparatus according to claim 1, wherein a space is provided between lower portions of the first and second expanding cushion parts, and the support panel connects the lower portions of the first and second expanding cushion parts to cover the space in a rearward direction of the vehicle.

4. The roof airbag apparatus according to claim 1, wherein an inner panel is provided at a bent portion of the first and second expanding cushion parts such that lateral ends thereof are fixed to inner surface of the first and second expanding cushion parts to separate inner space of the first and second expanding cushion parts into upper and lower channels.

5. The roof airbag apparatus according to claim 1, wherein an inner panel is provided at a bent portion of the at least an expanding cushion parts such that lateral ends thereof are fixed to inner surface of the at least an expanding cushion parts to separate inner space of the at least an expanding cushion parts into upper and lower channels.

* * * * *